United States Patent [19]

Matsuoka et al.

[11] 4,319,233

[45] Mar. 9, 1982

[54] DEVICE FOR ELECTRICALLY DETECTING A LIQUID LEVEL

[75] Inventors: Michihiro Matsuoka, Sunto; Yasumasa Ohba, Numazu, both of Japan

[73] Assignee: Kokusan Denki Co., Ltd., Numazu, Japan

[21] Appl. No.: 98,298

[22] Filed: Nov. 28, 1979

[30] Foreign Application Priority Data

Nov. 30, 1978 [JP] Japan ................................ 53-147252

[51] Int. Cl.³ ........................ G08B 21/00; G01F 23/00

[52] U.S. Cl. ........................................ 340/622; 73/295

[58] Field of Search ......................... 340/606, 622, 59; 323/366, 369; 73/295, 362 R, 362 AR, 755; 324/95, 57, 98, 101; 307/310

[56] References Cited

U.S. PATENT DOCUMENTS

| | | | |
|---|---|---|---|
| 2,861,159 | 11/1953 | Seney | 323/366 |
| 3,366,942 | 1/1968 | Deane | 340/608 |
| 3,474,963 | 10/1969 | Buiting | 307/310 X |
| 3,701,138 | 10/1972 | Pulliam et al. | 340/622 |

*Primary Examiner*—John W. Caldwell, Sr.
*Assistant Examiner*—Daniel Myer
*Attorney, Agent, or Firm*—Pearne, Gordon, Sessions, McCoy & Granger

[57] ABSTRACT

This invention generally pertains to a device for electrically detecting a liquid level such as water, oil and so on, which is suitably used for an automatic operating apparatus for a pump, or for a liquid level warning device. The device of the invention comprises an electric heater disposed flush with a liquid level to be detected, a heater temperature detector to electrically detect a heater temperature to generate a heater temperature signal, and an environment temperature detector to electrically detect an environment temperature to generate an environment temperature signal. In one aspect of the invention, there is further provided a reference signal generator to generate a reference signal depending on the range of the environment temperatures at which the liquid level is to be detected, and a comparative circuit to electrically compare a difference between the heater temperature signal and the environment temperature signal to generate a level signal. In another aspect of the invention, there is provided a comparative circuit to electrically compare a ratio of said heater temperature signal to said environment temperature signal with a reference ratio depending on the range of the environment temperatures at which said liquid level is to be detected to generate a level signal.

1 Claim, 3 Drawing Figures

DEVICE FOR ELECTRICALLY DETECTING A LIQUID LEVEL

BACKGROUND OF THE INVENTION

In the prior arts, there have been several liquid level detecting device, one of which is adapted to photo-electrically detect a given level of liquid, and another of which is adapted to electrically detect a level of liquid using an electrical conductivity of liquid. However, in the former device, photoelectric converting means tends to be tainted by liquid to thereby operate the device in an erroneous manner, and in the latter device, detecting electrodes tend to be covered with insulation such as oil to thereby operate the device also in an erroneous manner.

In another prior art, there has been a device for electrically detecting a level of liquid using an electrically heating and thermally sensitive resistor means disposed flush with a liquid level to be detected. Such a device has been disclosed by U.S. Pat. No. 3,222,578 dated on Dec. 7, 1965, in which a liquid is of liquefied gas. This device utilizes a difference between the temperature $t_0$ when the thermally sensitive resistor means is not in contact with the liquid and the temperature $t_1$ when the resistor means is in contact with the liquid. In the device, the difference of temperature ($t_0-t_1$) is required to be more than a range of variation in the temperature of environments. Therefore, if it is required that the range of variation in the temperature of environments for making the detection of liquid level possible is larger, then the temperature $t_0$ when the resistor means is not in contact with the liquid is required to be substantially high. For example, if it is required that the detection of liquid level is possible for the environment temperature of 0° to 60° C., it reaches the temperature of more than 120° C. Thus, it will be noted that the temperature of the thermally sensitive resistor means should be too high. This causes consuming electric power to be disadvantageously and ineconomically high.

SUMMARY OF THE INVENTION

Accordingly, it is a principal object of the invention to provide a device for electrically detecting a liquid level wherein a rise of temperature of heat generating means can be restrained so as to decrease a consuming electric power.

It is another object of the invention to provide a device for electrically detecting a liquid level wherein a liquid level can be more precisely detected with a wider range of environment temperatures.

It is another object of the invention to provide a device for electrically detecting a liquid level wherein components such as heat generating means or temperature detecting means can be used for a longer time.

In accordance with one aspect of the invention, there is provided a device for electrically detecting a liquid level comprising;

an electric heater disposed flush with a liquid level to be detected;

a heater temperature detector to electrically detect a temperature of said electric heater to generate a heater temperature signal;

an environment temperature detector to electrically detect an environment temperature to generate an environment temperature signal;

a reference signal generator to generate a reference signal depending on the range of the environment temperatures at which said liquid level is to be detected;

and a comparative circuit to electrically compare a difference between said heater temperature signal and said environment temperature signal with said reference signal to generate a level signal.

In accordance with another aspect of the invention, there is provided a device for electrically detecting a liquid level comprising;

an electric heater disposed flush with a liquid level to be detected;

a heater temperature detector to electrically detect a temperature of said electric heater to generate a heater temperature signal;

an environment temperature detector to electrically detect an environment temperature to generate an environment temperature signal;

a comparative circuit to electrically compare a ratio of said heater temperature signal to said environment temperature signal with a reference ratio depending on the range of the environment temperatures at which said liquid level is to be detected to generate a level signal.

BRIEF DESCRIPTION OF THE DRAWING

The above and other objects and feature of the invention will be apparent from the description of the embodiments of the invention taken with reference to the accompanying drawing in which.

DETAILED DESCRIPTION OF THE EMBODIMENTS

Figure 1:
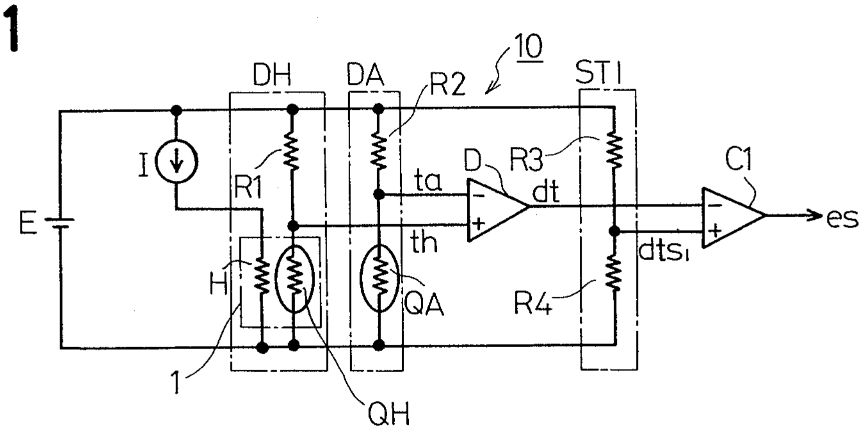
FIG. 1 is a schematic diagram of an embodiment of the invention.

FIG. 1 shows an embodiment of a device 10 for electrically detecting a liquid level constructed in accordance with the invention. The device 10 comprises an electric heater H connected through a constant current element I to a power supply E so that a constant current flows therethrough. The electric heater H may comprise an electric resistor, an electric semiconductor element such as Zener diode or transistor.

The device 10 also comprises a heater temperature detector DH to electrically detect a heater temperature th and an environment temperature detector DA to electrically detect an environment temperature ta. The detector DH includes an electric resistor $R_1$ and a thermally sensitive resistor QH connected in series to each other and connected to the power supply E. The detector DA also includes an electric resistor $R_2$ and a thermally sensitive resistor QA connected in series to each other and connected to the power supply E. The thermally sensitive resistors QH and QA may be of a thermistor having a negative coefficient of temperature, a posistor (trademark) having a positive coefficient of temperature or the like. The electric heater H and the thermally sensitive resistor QH of the heater temperature detector DH are disposed adjacent to each other and within a casing (not shown) having a thermal conductivity. Otherwise, they may be molded by plastic resin having a high thermal conductivity. The electrical heater H and the thermally sensitive resistor QH thus form a level detecting means 1. The detecting means 1 is disposed within a liquid reservoir so as to be flush with a liquid level to be detected.

A comparator D is provided which serves to compare a heater temperature signal th from the heater temperature detector DH with an environment temperature signal ta from the environment temperature detector DA to generate a difference signal dt corresponding to the difference of the signals (th–ta).

The device 10 also comprises a reference signal generator $ST_1$ which includes electric resistors $R_3$ and $R_4$ connected in series to each other and connected to the power supply E. The reference signal generator $ST_1$ serves to generate a reference signal $dts_1$ depending on the environment temperatures at which the liquid level is to be detected. The reference signal $dts_1$ is so determined to be less than the temperature difference between the heater temperature signal $th_0$ and the maximum environment temperatures signal ta when the detecting means 1 is not in contact with the liquid and to be more than the temperature difference between the heater temperature signal $th_1$ and the maximum environment temperature signal ta when the detecting means 1 is in contact with the liquid.

A comparative circuit $C_1$ is provided which serves to compare the difference signal dt with the reference signal $dts_1$ to generate a level signal $e_s$ therefrom.

In operation, let it be supposed that the temperature of liquid is substantially equal to or slightly lower than the maximum environment temperature and that when the liquid is not in contact with the detecting means 1, the heater temperature is always higher than the maximum environment temperature. If the surface of the liquid is lower than the level of the detecting means 1 so that the detecting means 1 is in contact with an air, then the heater temperature is raised up because heat from the heater H is radiated ineffectively. Therefore, the temperature difference dt between the heater temperature signal $th_0$ and the environment temperature signal ta is fully more than the reference signal $dts_1$. On the other hand, if the surface of liquid is higher than the level of the detecting means 1 so that the detecting means 1 is in contact with the liquid, then the heater temperature is lowered because heat from the heater H is radiated effectively. Therefore, the temperature difference signal dt between the heater temperature signal $th_1$ and the environment temperature signal ta is less than the reference signal $dts_1$. Thus, it will be noted that if dt is higher than $dts_1$, the surface of the liquid is lower than the liquid level to be detected, while if dt is lower than $dts_1$, the surface of the liquid is higher than the liquid level to be detected. Therefore, if the level signal $e_s$ has the values different from each other. at $dt > dts_1$ and at $dt < dts_1$, it can be found whether the surface of the liquid is lower or higher than the given liquid level.

It should be noted that the feature of the invention in which the difference between the heater temperature and the environment temperature is compared with the reference temperature difference causes the heater temperature when the detecting means 1 is not in contact with the liquid to be slightly higher than the maximum environment temperature at which the liquid level is to be detected. Thus, the maximum temperature of the heater H may be substantially lowered. For example, in case it is required to detect the liquid level within the range of the environment temperatures of 0° to 60° C., at the reference temperature difference of 10° C., the heater temperature may be at 80° C. when the environment temperature is at 60° C. Thus, it will be noted that the heater temperature may be substantially lower than at least 120° C. at which the heater temperature of the prior art is required to be.

Figure 2:
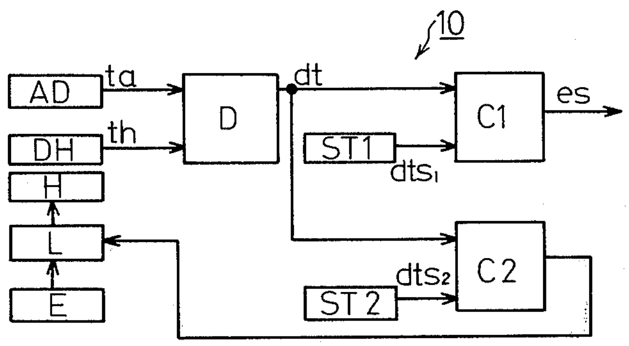
FIG. 2 is a block diagram of a modification of the embodiment of FIG. 1.

FIG. 2 shows a modification of the embodiment of FIG. 1 in which a current limiter L such as a transistor is provided between the power supply E and the heater H. A second reference signal generator $ST_2$ generates a second reference signal $dts_2$ which is so set to be larger than the first reference signal $dts_1$. A second comparative circuit $C_2$ receives the temperature difference signal dt from the comparator D and the second reference signal $dts_2$ from the second reference signal generator $ST_2$ to compare them to generate a control signal therefrom. The control signal is supplied to the current control means L so as to control the current from the power supply E to the heater H. If the current control means L comprises a transistor, then the control signal is supplied to the base of the transistor so as to control the resistance between the emitter and the collector of the transistor to control the heater current.

In the modification of FIG. 2, if the temperature difference signal dt begins to exceed the second reference signal $dts_2$, the comparative circuit $C_2$ generates the control signal to thereby operate the current control means L so as to control the heater current through the heater H. Thus, it will be noted that the difference between the heater temperature and the environment temperature is so controlled to be less than a given temperature different corresponding to the second reference signal $dts_2$. This prevents the temperature of the heater from being substantially high, and causes consuming electric power to be substantially saved.

Figure 3:
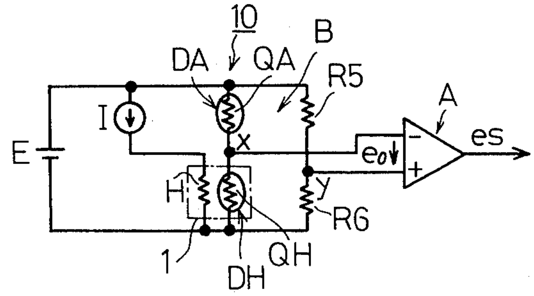
FIG. 3 is a schematic diagram of another embodiment of the invention.

FIG. 3 shows another embodiment of the invention in which a ratio of the heater temperature to the environment temperature is detected. In this embodiment, a bridge circuit B comprises an arm of a series connection of the thermally sensitive resistor QA of the environment temperature detector DA and the thermally sensitive resistor QH of the heater temperature detector DH and another arm of the series connection of the electrical resistors $R_5$ aand $R_6$ which is connected in parallel to the aforementioned series connection. An operational amplifier A has input terminals connected to the output terminals X and Y of the bridge circuit B to generate a level signal $e_s$ therefrom.

In the embodiment of FIG. 3, supposing that the resistance values of the thermally sensitive resistors QA and QH are ra and rh, respectively, that the resistance values of the resistors $R_5$ and $R_6$ are $r_5$ and $r_6$, respectively, and that the voltage across the power supply E is $E_0$, the voltage $e_0$ which is indicated by an arrow at the output terminals X and Y of the bridge circuit B is expressed as follows;

$$e_0 = E_0(ra \cdot r_6 - r_5 \cdot rh)/(r_5 + r_6)(ra + rh) \quad (1)$$

When the ratio of $r_6$ to $r_5$ is larger than the ratio of rh to ra, the output signal $e_s$ which is more than 0 appears at the output of the operational amplifier A, but when the ratio of $r_6$ to $r_5$ is smaller than the ratio of rh to ra, the output signal $e_s$ which is less than 0 disappears at the output of the operational amplifier A.

Let it be supposed that the thermally sensitive resistors QA and QH comprise thermistors of the same characteristics having a negative coefficient of temperature, and that the resistance value of the thermally sensitive resistor QH is $rh_0$ when the detecting means 1 is not in contact with the liquid, while the resistance value of the thermally sensitive resistor QH is $rh_1$ ($>rh_0$) when the detecting means 1 is in contact with the liquid. The ratio of the resistance value $r_6$ of the resistor $R_6$ to the resistance value $r_5$ of the resistor $R_5$ is so determined to have a reference value more than $rh_0/ra$ and less than $rh_1/ra$. With the resistance values of the resistors $R_5$ and $R_6$, determined in the aforementioned manner, when the surface of liquid is lower than the level of the detecting means 1 so that the temperature of the heater H becomes higher so as to decrease the resistance value of the thermally sensitive resistor QH, the ratio of the resistance value $r_6$ of the resistor $R_6$ to the resistance value $r_5$ of the resistor $R_5$ is more than the ratio of the resistance value rh ($=rh_0$) of the thermally sensitive resistor QH to the resistance value ra of the thermally sensitive resistor QA. This causes the voltage $e_0$ indicated at the expression (1) to be more than 0. Thus, the operational amplifier A generates the level signal indicating that the surface of the liquid is lower than the given liquid level. On the other hand, when the surface of the liquid reaches the given liquid level so that the detecting means 1 is in contact with the liquid so as to decrease the temperature of the heater H, the ratio of the resistance value $r_6$ to $r_5$ is less than the ratio of the resistance value rh ($=rh_1$) to ra. This causes the voltage $e_0$ at the expression (1) to be less than 0. Thus, the operational amplifier A generates no level signal. In the embodiment of FIG. 3, if the polarities of the operational amplifier A are reversed, or if the thermally sensitive resistors QA and QH are in the form of posistor (trademark) having a positive coefficient of temperature, then the operational amplifier A generates the level signal when the surface of the liquid will be supposed to be higher than the given liquid level.

Although, in the embodiments of FIGS. 1 to 3, the thermally sensitive resistor QH of the heater temperature detector DH is separately provided from the electric resistor of the heater H, the thermally sensitive resistor QH may be integrally used also as the heater resistor H, which is not provided separately from the thermally sensitive resistor. However, the thermally sensitive resistor and the heater are preferably provided in a separate manner because the temperature of the thermally sensitive resistor can be more restrained than that of the heater by controlling the thermal conductivity between the thermally sensitive resistor and the heater, which causes the reliability of the thermally sensitive resistor to be more improved.

Although, in the embodiment of FIG. 3, the temperature detectors DH and DA are composed of a single thermally sensitive resistor, they may be composed of two or more than two electrically resisting elements such as electric resistors connected in series, in parallel or in combination of series and parallel to them so as to adjust the temperature characteristics of the thermally sensitive resistor. It will be understood that the temperature detectors may comprise a temperature detecting element other than thermally sensitive resistor.

Although some preferred embodiments of the invention have been illustrated and described with reference to the accompanying drawing, it will be understood to those skilled in the art that they are by way of example, and that various changes and modifications in the arrangement and the components may be made within departing from the spirit and scope of the invention, which is intended to be defined only by the appended claims.

What is claimed is:

1. A device for electrically detecting a liquid level comprising:

an electrical heater disposed flush with a liquid level to be detected;

a heater temperature detector to electrically detect a temperature of said electrical heater to generate a heater temperature signal;

an environment temperature detector to electrically detect an environment temperature to generate an environment temperature signal;

a first reference signal generator to generate a first reference signal depending on the range of the environment temperatures at which said liquid level is to be detected;

a first comparative circuit connected to electrically compare a different between said heater temperature signal and said environment temperature signal with said first reference signal to generate a level signal;

current control means connected for controlling a current which flows through said electrical heater;

a second reference signal generator to generate a second reference signal having a level higher than that of said first reference signal; and a second comparative circuit connected to electrically compare said different between said heater temperature signal and said environment temperature signal with said second reference signal, said second comparative circuit having an output connected to said current control means whereby the maximum heater temperature is limited.

* * * * *